United States Patent [19]

Krupman et al.

[11] 3,964,900

[45] June 22, 1976

[54] SLAG-FORMING MIXTURE

[76] Inventors: Leonid Isaakovich Krupman, ulitsa R. Ljuxemburg, 30a, kv. 17; Ary Mikhailovich Okonishnikov, ulitsa Naberezhnaya, 117a, kv. 86; Alexandr Egorovich Sochnev, ulitsa Naberezhnaya, 147, kv. 2; Boris Viktorovich Gavronsky, Bulvar Shkolny, 21, kv. 30; Viktor Alexeevich Popov, prospekt Ilicha, 85, kv. 159; Anatoly Nikolaevich Kalashnik, ulitsa Krasnoflotskaya, 98, kv. 39; Vasily Sergeevich Chumachenko, prospekt Ilicha, 85, kv. 116; Veniamin Mikhailovich Gudkevich, bulvar Shevchenko, 69, kv. 32; Georgy Alexeevich Panev, ulitsa Gorkogo, 154, kv. 4; Vasily Ivanovich Detochka, ulitsa Polotskaya, 20g, kv. 24; Savely Adolfovich Telesov, bulvar Shkolny, 13, kv. 29; Leonid Moiseevich Pokrass, ulitsa Pionerskaya, 98; Abram Mikhailovich Ofengenden, ulitsa Tkachenko, 135, kv. 20; Raisa Petrovna Nesterovich, bulvar Pushkina, 25, kv. 11; Georgy Gavrilovich Zhitnik, bulvar Pushkina, 25, kv. 21, all of Donetsk, U.S.S.R.

[22] Filed: Mar. 3, 1975

[21] Appl. No.: 554,541

[52] U.S. Cl. .......................................... 75/94; 75/30; 75/58
[51] Int. Cl.$^2$ .................................................. C22B 9/10
[58] Field of Search ................ 75/27, 94, 30, 52–58

[56] References Cited
UNITED STATES PATENTS

| | | | |
|---|---|---|---|
| 2,416,179 | 2/1947 | Kemmer | 75/53 |
| 2,799,575 | 7/1957 | Tisdale | 75/55 X |
| 2,836,486 | 5/1958 | Brennan et al. | 75/27 X |
| 3,314,782 | 4/1967 | Arnaud | 75/57 |
| 3,320,052 | 5/1967 | Bowden | 75/53 |

*Primary Examiner*—M. J. Andrews
*Attorney, Agent, or Firm*—Haseltine, Lake & Waters

[57] ABSTRACT

A mixture for refining metals, comprising (weight per cent):

| | |
|---|---|
| lime | 30 – 70, |
| sodium nitrate | 15 – 30, |
| aluminum-containing component | 8 – 25, |
| fluorspar | the balance. |

The proposed mixture is of particular advantage in non-furnace refining of molten ferrous metals of responsible application which should meet most stringent specifications as to their freedom from sulfur, oxygen and non-metalics.

9 Claims, No Drawings

SLAG-FORMING MIXTURE

The present invention relates to the production of metals and more particulary of slag-forming mixtures for refining metals.

The present invention may prove to be most advantageous in the non-furnace refining of molten ferrous metals of responsible application which should meet more stringent specification as to their freedom from sulfur, oxygen and non-metallics.

Known in the art are solid mixtures for refining metals whose composition incorporates slag-forming materials melted by the heat of the metal being treated.

A disadvantage of such mixtures is the need for additional overhearting of steel to replace heat losses for melting the mixtures. Therefore only small amounts of such mixtures can be used (8 – 10 kg per 1 t of steel).

The low efficiency of solid slag-forming mixtures is attributable both to their low specific consumption and to the fact that refining is initiated at the last stages of the tapping operation upon melting the mixture.

Low refining efficiency can be compensated for by the possibility of melting the starting slag-forming materials in a separate unit, e.g., an electric furnace. However, it would call for the construction of a sophisticated and expensive unit.

Moreover, an electric furnace would allow melting materials featuring a higher evaporation temperature (above 3000°C) and usually a high melting point.

Also known is a slag-forming mixture for refining metals, comprising lime, an oxidizer, oxidized materials and fluorspar. The constituents incorporated into the composition of this mixture interact liberating heat needed to melt the mixture and to provide the requisite overheat of the slag (c.f. British Pat. No. 1,170,168, Mar. 17, 1967.

A main disadvantage of these mixtures resides in the mandatory presence in their composition of ferric oxides as oxidizers. The use of such an oxidizer diminishes the refining efficiency, insofar as it does not rule out the possible transition of a fraction of ferric oxides into the slag with the ensuing sharp reduction in its desulfurizing and deoxidizing capacity. Moreover, ferric oxides, as an oxidizer, contain a small amount of oxygen (about 30%) and upon interaction with a reducer liberate a small amount of heat.

Moreover, the only oxidized materials (reducers) employed in this mixture are powdered magnesium, calcium, silicon and their mixtures which are dangerously explosive.

The main object of the invention is the provision of a slag-forming mixture which would precondition the formation of slag featuring a higher ability than the known slag-forming mixtures comprising ferric oxides.

Another object of the invention is the provision of a slag-forming mixture higher in oxygen and liberating upon interaction with oxidized materials a larger amount of heat than ferric oxides employed in the known mixtures which in turn would contribute to the washing out of the slag, refining metal being treated.

Said and other objects are achieved by providing a slag-forming mixture for refining metals, comprising lime, an oxidizer, an oxidized component and fluorspar, the mixture, according to the invention, comprising 15–30 weight per cent sodium nitrate taken as the oxidizer and 8–25 weight per cent aluminum-containing material as the oxidized component, the weight percentage of said components being as follows:

| | |
|---|---|
| lime | 30 – 70; |
| fluorspar | the balance. |

As for the aluminum-containing material, use may be made of powdered aluminum. It ensures a minimum amount of oxidized materials and of an oxidizer in the mixture and a maximum lime content, this resulting in a higher efficiency of the treatment, e.g. with the degree of desulfurization increased to 70 – 80% as compared with 60 – 65% obtained with other aluminum containing components.

It is also expedient that sifted aluminum turnings with an aluminum content above 50% and a particle size from 0.5 to 1.5 mm be used as the aluminum-containing material.

The use of the above sifted turnings renders the above material and, hence, the mixture as a whole explosion-proof. Moreover, the cost of the sifted turnings is 2–3 times less than that of powdered aluminum.

It is also sound practice that foundary aluminum dross with an aluminum content above 50% and a particle size of 0.5 – 1.5 mm be used as the aluminum-containing material.

Such foundry dross also provides an explosion-proof mixture and decreases its cost.

Further, the slag-forming mixture of the invention comprisng 8 – 15 weight per cent of an aluminum-containing component, incorporates also 6 – 8 weight per cent of a silicon-containing component having a silicon content above 65% .

The use of such a silicon-containing component increases the possibility of adjusting the physicochemical properties of the slag obtained upon burning the mixture, such as ductility, surface characteristics, and decreases its cost.

Given hereinbelow is a detailed description of a particular embodiment of the present invention.

There is proposed a slag-forming mixture for refining metals, comprising lime, an oxidizer, an oxidized component and fluorspar. According to the invention, the composition, of the slag-forming mixture incorporates also 15–30 weight per cent of sodium nitrate and 8 – 25 weight per cent of an aluminum-containing material taken as the oxidized component.

Said oxidizer and oxidized component are incorporated into the composition of the proposed mixture containing (weight per cent):

| | |
|---|---|
| lime | 30 – 70, |
| fluorspar | the balance. |

The oxidized components employed in the proposed mixture involve such materials that are explosion-proof and whose cost is 2 – 3 times less then that of similar components incorporated into the mixtures.

Such materials include an aluminum containing material accounting for 8–25% of the mixture weight. As compared with other oxidized materials of a similar type (magnesium, calcium silicon-containing materials) the proposed aluminum-containing materials upon interaction with the oxidizer liberate more heat (by 1.1 – 2.0 times) and their oxidation product — alumina — is a diluting oxide in basic slags (as compared with calcium and magnesium) and does not effect the efficiency of treatment (as compared with silicon).

The amount of the aluminum-containing component is selected within 8 – 25% depending on both the aluminum content of the component (the lower amount, i.e., 8 – 12%, corresponding to the component containing 90% aluminum and over, and the larger one — 12 – 25% — to a component with 50 – π% aluminum) and on the heat liberated which should range within 2000–3000 kj per 1 kg of the proposed mixture, which in turn is determined by the nature and quality of the starting slag materials.

Using an amount of the aluminum-containing component of less than 8%, the quantity of heat liberated during the oxidation of aluminum will be insufficient to heat the slag to a steel temperature which will result in its cooling and diminish the refining efficiency. A mixture with a small amount of this component burns slowly which also causes additional losses of heat into ambient air. The larger (above 25%) amount of the above component results in a violent combustion of the mixture with slag ejection, the cost of such mixture grows and the amount of inert (as to the extraction of harmful impurities) alumina in the slag increases.

As to the oxidizer, sodium nitrate is employed as the most inexpensive and low hydroscopic (as compared with other nitrates and chlorates) material. As opposed to, for example, potassium or ammonium nitrates, sodium nitre is less dangerous from the point of view of detonation in case carbohydrates (oil, grease) happen to get therein.

As compared with metal oxides (ferric, manganese), sodium nitrate comprises more (by 1.5 times) oxygen and liberates more (twice as much) heat when interacting with the oxidized materials.

The amount of sodium nitrate that is held within 15–30% is selected in a stoichiometric ratio with the oxidized materials. Lower sodium nitrate contents retard the formation of slag and result in incomplete oxidation of the oxidized materials, while higher contents add to the mixture cost and diminish the efficiency of treatment owing to a corresponding reduction in amount of the slag-forming materials (lime, fluorspar). Sodium nitrate is used in a pulverized state with a particle size of less than 1.0 mm.

The composition of the proposed mixture incorporates lime as the most efficient material in terms of its relation to steel to be desulfurized. Unslaked lime should be employed with a minimum amount of moisture in the form of hydroxide and calcium carbonate. Lime can be used in the form of ground lime with particles of less than 1.0 mm, sifted metallurgical lime or that used for oxygen converters with a particle size less than 10 – 15 mm.

The amount of lime is selected within 30 – 70%. The lower limit corresponds to mixtures containing 25% and 30% of oxidized materials and oxidizer accordingly, and the top limit to those with 8 and 15% accordingly. Lime contents of less than 30% diminish treatment efficiency (e.g., metal desulfurization) and those above 70% increase ductility (above 2–3 poises) of the slag obtained which adversely affects the efficiency of treatment as well.

The composition of the proposed mixture incorporates fluorspar which is needed to liquefy the slag and to adjust the combustion rate. Its amount is determined by the difference in the above-specified materials and usually ranges within 5 – 20%.

Fluorspar may be replaced by other fluorides — cryolite, magnesium fluoride, etc. Fluorspar or other fluorides must be comminuted to particles of less than 2.0 mm.

As to the aluminum-containing component, use may be made of powdered aluminum produced from secondary aluminum. If that is the case, it ensures a minimum amount of the oxidized materials and oxidizer and a maximum quantity of lime in the mixture with the ensuing increase in the efficiency of treatment (e.g., the degree of desulfurization increases to up to 70 – 80%).

In case sifted aluminum turnings are employed as an aluminum-containing component, the detonation hazard is eliminated, since the turnings should be 0.5 – 1.5 mm in size. Thus, a dust-like fraction less than 0.5 is not available which provides the explosion-proof characteristics of the material and of the mixture as a whole. Moreover, the cost of sifted turnings is 2 – 3 times less then that of powdered aluminum, this diminishing the cost of steel treatment by 1.5 – 2.0 times.

With turning particles of not more than 1.5 mm, the speed of slag-formation is reduced, heat losses during the burning of the mixture increase and, hence, steel is cooled to a higher extent during refining.

The aluminum content of the turnings should be above 50% since with lower contents its amount and, consequently, that of the oxidizer in the mixture increases, treatment efficiency diminishes owing to a lower lime content in the mixture and to higher amounts of harmful oxides (silica, ferric oxides) in the sifted turnings.

Foundry aluminum dross which is much less scarce than sifted aluminum turnings can be also employed as the aluminum-containing material.

The use of foundry dross diminishes also the cost of the proposed mixture and eliminates explosion hazard. Both the particle size (0.5 – 1.5 mm) and aluminum content (above 50%) are dictated by the same considerations as those governing the use of sifted turnings.

A mixture of powdered aluminum, sifted aluminum turnings and foundry aluminum dross may be also employed as the aluminum-containing material.

In this case the advantages of these materials are combined: high efficiency peculiar to the mixtures with powdered aluminum, low cost and explosion-proof properties of those containing sifted turnings and foundry dross.

According to the invention, the composition of a mixture comprising 8–15% of the aluminum-containing component incorporates 6–8% of a silicon-containing component with more than 65% silicon. The use of this component increases the possibility of controlling the physicochemical properties of the slag obtained during the burning of this mixture, such as, ductility and surface characteristics, and diminishes its cost.

The amount of the silicon-containing component is held within 6–8% since with greater contents the efficiency of desulfurization and metal purification from oxygen and non-metallics is decreased by 5–10%.

The silicon content of such a component should exceed 65%, otherwise its amount (and, hence, that of the oxidizer) in the mixture increases decreasing the amount of lime in the mixture.

The silicon-containing component is employed in a pulverized state (with a particle size less than 1.5 mm).

The mixture is prepared by blending proportionate constituents until a homogeneous mixture is obtained.

It is most expedient that the mixture be burnt prior to tapping molten metal from a melting unit.

Molten slag formed during burning is employed for treating metal by mixing it therewith.

The herein-proposed mixture ensures the production of refined molten slag with a melting point ranging within 1250° – 1350°C, ductility of less 0.5 poise at temperatures above 1500°C, the slag being heated to 1550°–1650°C, i.e. to a metal-tapping temperature, and comprising 45–65% calcium oxide, 20–40% alumina, 3–5% sodium oxides, 5–20% fluorides, 2–10% silica and up to 1% of each of the metal oxides of magnesium, manganese and iron.

The use of this mixture ensures a reduction in sulfur and sulfide inclusions by 50 – 80%, and of oxygen and oxide inclusions by 10–30%.

Other advantages of the proposed mixture will become more fully apparent from the following examples.

EXAMPLE 1

To refine 60 t of steel of responsible application melted in electric furnaces, mainly, alloy and high-alloy steels, low in carbon (less than 0.3%) which should meet the most stringent specifications as to its sulfur, oxygen and non-metallics contents (e.g., with a sulfur content of less than 0.010%), a mixture is taken containing (weight per cent):

| | |
|---|---|
| Aluminum powder | 10 |
| sodium nitrate | 17 |
| lime | 63 |
| fluorspar | 10. |

Mixture consumption is 4% of the weight of steel being treated which amounts to 2.5 t. Burning lasts 20 min and results in the formation of slag heated to a temperature of 1600°C and comprising (weight per cent):

| | |
|---|---|
| calcium oxide | 65 |
| alumina | 15 |
| calcium fluoride | 15 |
| Sodium oxide | 3 |
| other oxides (silica, ferric oxides, magnesium oxides) | 2. |

The results obtained are as follows: the degree of desulfurization - above 55%, oxygen extraction — by 30%, the amount of non-metallics decreased by 2.5 times, sulfur content of the prepared steel ranges within 0.004 – 0.010%, the original sulfur content is 0.015 – 0.025%.

EXAMPLE 2

To treat steel for gas mains melted in a 130-t oxygen converter, with a maximum sulfur contents of 0.015%, 4 t of a mixture are taken of the following composition (weight per cent):

| | |
|---|---|
| sifted aluminum turnings | 20 |
| sodium nitrate | 18 |
| lime | 57 |
| fluorspar | 5 |

Four tons of the above mixture burn during 30 min and the slag formed is heated to a temperature of 1580°C, features a melting point of 1300°C and comprises (weight per cent):

| | |
|---|---|
| calcium oxide | 58 |
| alumina | 30 |
| sodium oxide | 4 |
| calcium fluoride | 6 |
| the balance | 2. |

The following results were obtained: the degree of desulfurization was not less than 50%, oxygen extraction — by 20%, sulfur content of the prepared steel was 0.07 – 0.012% with the original content ranging within 0.030–0.040%.

EXAMPLE 3

For treating open-hearth steel melted in a 150-t furnace and intended for producing crankshafts which should contain less than 0.020% sulfur, a mixture of the following composition (weight per cent) is taken:

| | |
|---|---|
| aluminum dross | 25 |
| sodium nitrate | 22 |
| lime | 43 |
| fluorspar | 20. |

Mixture consumption is 30 kg per ton of steel which amounts to 4.5 t. Burning of 4.5 z of this mixture lasts 25 min and results in the formation of molten slag heated to a temperature of 1600°C, featuring a melting point of 1250°C and comprising (weight per cent):

| | |
|---|---|
| calcium oxide | 45 |
| alumina | 25 |
| sodium oxide | 6 |
| calcium fluoride | 22 |
| the balance | 2 |

The following results were obtained: the degree of desulfurization more than 50%, oxygen extraction by 20%, sulfur content of the prepared steel was 0.007 – 0.015% with the original content ranging within 0.018–0.040%.

EXAMPLE 4

0.8 - 1.0 t of a mixture are taken for treating iron for mill rolls in 80-t ladles, the mixture comprising (weight per cent):

| | |
|---|---|
| sifted aluminum turnings | 15 |
| 75% ferrosilicon | 8 |
| sodium nitrate | 30 |
| lime | 30 |
| cryolite | 17. |

Mixture consumption amounts to 8–10 kg per 1 t of iron. Burning lasts 15 min and results in the formation of slag, comprising (weight per cent):

| | |
|---|---|
| calcium oxide | 35 |
| alumina | 25 |
| silica | 15 |
| sodium oxide | 7 |
| sodium and aluminum fluorides | 15 |
| the balance | 3. |

Slag is heated to 1500°C, its melting point is 1250°C, it features a ductility of less than 0.3 poise at temperatures above 1400°C. The following results were obtained: the degree of desulfurization — not less than 65%, post treatment sulfur content was less than 0.025% with its original content ranging from 0.070 to 0.70%.

EXAMPLE 5

To refine steel when pouring it into a mold a mixture is taken of the following composition (weight per cent):

| | |
|---|---|
| aluminum powder | 8 |
| aluminum-containing foundry dross | 10 |
| sodium nitrate | 20 |
| lime | 42 |
| fluorspar | 20. |

Mixture consumption amounts to 8 kg per 1 t steel. The mixture is burnt, the thus-obtained slag is cooled, crushed to a particle size of 0.5 – 2.0 mm and is added continuously during the entire pouring process.

The following results were obtained: the degree of desulfurization — not less than 60%, sulfur content of prepared steel — less than 0.015% with an original sulfur content of 0.025 – 0.040%. The amount of non-metallic in steel was decreased by 2–4 times.

EXAMPLE 6

For treating high-carbon steel, e.g. roller-bearing steel, melted in a 30-t electric furnace, 1.5 t of a mixture are taken, the mixture having the following composition (weight per cent):

| | |
|---|---|
| aluminum powder | 8 |
| sodium nitrate | 15 |
| lime | 70 |
| cryolite | 7. |

Mixture consumption amounts to 4% per 30 t steel. The mixture is burnt producing molten slag heated to 1550°C and comprising (weight per cent):

| | |
|---|---|
| calcium oxide | 70 |
| alumina | 17 |
| sodium oxide | 3 |
| aluminum and sodium fluorides | 8 |
| the balance | 2 |

The results are as follows: the degree of desulfurization — over 60%, sulfur content of the prepared metal — 0.005 – 0.010% with an original concentration of 0.015–0.025%, the amount of non-metallics diminished by 2–3 times.

What we claim is:

1. A slag-forming mixture for refining metals consisting of, in weight per cent,: 30–70, lime; 15 – 30, sodium nitrate as an oxidizer; 8–25, an aluminum-containing material as an oxidized component; and the balance, a fluoride selected from the group consisting of fluorspar, cryolite and magnesium fluoride.

2. The slag-forming mixture of claim 1, wherein the aluminum-containing material is powdered aluminum.

3. The slag-forming mixture of claim 1, wherein the aluminum-containing material comprises sifted aluminum turnings with a particle size from 0.5 to 1.5 mm having an aluminum content above 50%.

4. The slag-forming mixture of claim 1 wherein the aluminum-containing material is foundry aluminum dross with a particle size from 0.5 to 1.5 mm containing more than 50% aluminum.

5. The slag-forming mixture of claim 1 wherein the amount of fluoride is 5–20 per cent by weight.

6. The slag-forming mixture of claim 5 wherein the lime and sodium nitrate have a particle size less than 1.0 mm, the aluminum - containing material has a particle size of not more than 1.5 mm and the fluoride has a particle size of less than 2.0 mm.

7. A slag-forming mixture for refining metals consisting of, in weight per cent, 30–70, lime; 15–30, sodium nitrate as an oxidizer; 8–15, an aluminum-containing material as an oxidized component; 6–8, a silicon-containing component having a silicon content above 65%; and the balance, a fluoride selected from the group consisting of fluorspar, cryolite and magnesium fluoride.

8. The slag-forming mixture of claim 7 wherein the silicon-containing component is ferrosilicon.

9. The slag-forming mixture of claim 8 wherein the lime and sodium nitrate have a particle size less than 1.0 mm, the aluminum-containing material has a particle size of not more than 1.5 mm, the silicon-containing component has a particle size of less than 1.5 mm and the fluoride has a particle size of less than 2.0 mm.

* * * * *